United States Patent [19]

Sugimoto et al.

[11] Patent Number: 5,198,394
[45] Date of Patent: Mar. 30, 1993

[54] SINTERED CERAMIC BODY, A METHOD OF MAKING SAME AND SPARK PLUG INSULATOR MADE THEREFROM

[75] Inventors: Makoto Sugimoto; Mamoru Musasa; Hiroyuki Tanabe; Konishi Masahiro, all of Nagoya, Japan

[73] Assignee: NGK Spark Plug Co., Ltd., Nagoya, Japan

[21] Appl. No.: 775,815

[22] Filed: Oct. 11, 1991

[30] Foreign Application Priority Data

Oct. 12, 1990 [JP] Japan ................................. 2-274896

[51] Int. Cl.$^5$ .............................................. C04B 35/58
[52] U.S. Cl. ........................................ 501/98; 501/96
[58] Field of Search .............................. 501/96, 12, 98; 313/130, 131 A

[56] References Cited

U.S. PATENT DOCUMENTS 4,476,412 10/1984 Nishioa et al. ...................... 313/130

*Primary Examiner*—Karl Group
*Assistant Examiner*—Chris Gallo
*Attorney, Agent, or Firm*—Cooper & Dunham

[57] ABSTRACT

In a sintered ceramic body used for an insulator of a spark plug, magnesium (Mg) is uniformly diffused into grains of a nitride-based ceramic body. An amount of the diffused magnesium (Mg) is within a range from 20 ppm to 100 ppm which is calculated by reducing the magnesium (Mg) to its oxidized component.

7 Claims, 1 Drawing Sheet

SINTERED CERAMIC BODY, A METHOD OF MAKING SAME AND SPARK PLUG INSULATOR MADE THEREFROM

BACKGROUND OF THE INVENTION

1. Field of the Invention

This invention relates to a sintered ceramic body well-suited for a spark plug insulator which needs an elevated insulation property at high ambient temperature with good thermal conductivity.

2. Description of Prior Art

In a spark plug insulator for an internal combustion engine, a nitride-based sintered ceramic body has been employed since the sintered ceramic body has good thermal conductivity.

The nitride-based sintered ceramic body, however, comes to decrease its electrical insulation when exposed to high ambient temperature, and grows crystals treeing over the surface of the sintered ceramic body when high voltage is applied.

Therefore, it is an object of the invention to provide a sintered ceramic body and spark plug insulator which are capable of maintaining an elevated insulation property at high ambient temperature with good thermal conductivity.

SUMMARY OF THE INVENTION

According to the invention, there is provided a sintered ceramic body comprising magnesium (Mg) uniformly diffused into grains of a nitride-based ceramic body, an amount of the diffused magnesium (Mg) being within a range from 20 ppm to 100 ppm inclusive which is calculated by reducing the magnesium (Mg) to its oxidized component.

Further, the nitride-based ceramic body includes auxiliary agents up to 10 weight percent selected from the group consisting of alkali-based earth metals, rare-earth elements and mixture of the alkali-based earth metals and the rare-earth elements, the weight percentage of the auxiliary agents being calculated by reducing the agents to their oxidized component.

Furthermore, the nitride-based ceramic body is used as an insulator of a spark plug.

Since a nitride-based sintered ceramic is chemically structured by a strong covalent bondage, free electrons cause to represent electrical conductivity. An increased ambient temperature facilitates the movement of the free electrons to decrease an electrical resistance so as to reduce an insulation property of the sintered body.

By preparing magnesium (Mg) ranging from 20 ppm to 100 ppm, an amount of which is reduced by magnesium oxide (MgO), and uniformly diffusing the magnesium (Mg) into grains of the nitride-based ceramic body, the free electrons are caught by magnesium ions (Mg++) to prevent the ceramic body against the decrease of the electrical resistance. Prevention against the decrease of the electrical resistance leads to obviating the crystal growth of treeing.

Magnesium (Mg) of less than 20 ppm brings significantly no affect on the elevated insulation property. Magnesium (Mg) exceeding 100 ppm deteriorates the thermal conductivity.

Further, adding auxiliary agents up to 10 weight percent leads to an improved property of the sintered ceramic body. Addition of the auxiliary agents exceeding 10 weight percent causes to impair good thermal conductivity intrinsically provided with the nitride-based ceramic body.

With the nitride-based ceramic body employed to the spark plug insulator, there is provided a spark plug which is capable of maintaining an elevated insulation property and good thermal conductivity at a wide range of operating temperature.

These and other objects and advantages of the invention will be apparent upon reference to the following specification, attendant claims and drawings.

DETAILED DESCRIPTION OF THE EMBODIMENTS

Figure 1:
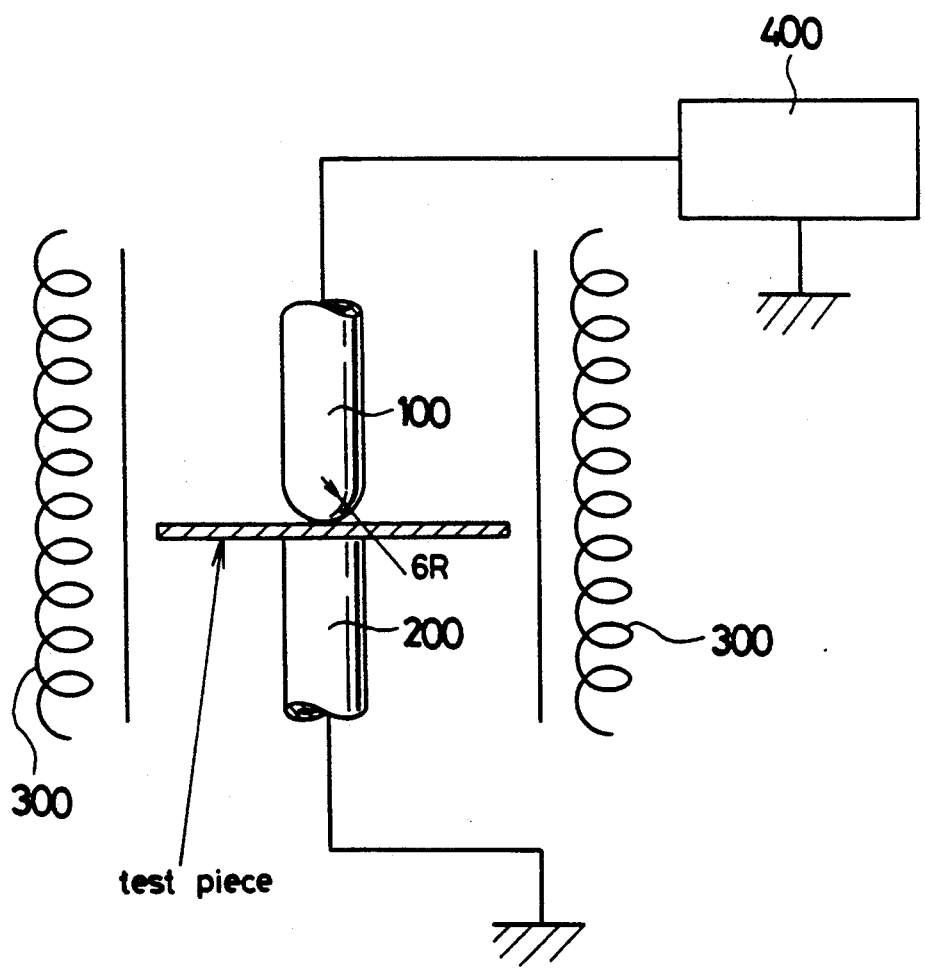
FIG. 1 is a schematic plan view showing a device to measure insulation resistance of test pieces at high temperature.

Referring to FIG. 1 and Table 1, an embodiment of the invention is described herein. Aluminum nitride (AlN) powder is prepared whose granular size measures 1.5 $\mu$m in average diameter (sedimentation analysis) with an oxygen-laden rate as 0.8 weight percent.

Auxiliary agents employed herein are all 99.9% purity selected alone or combination from the group consisting of yttrium oxide ($Y_2O_3$), calcium oxide (CaO), strontium oxide (SrO), scandium oxide ($SC_2O_3$), neodymium oxide ($Nd_2O_3$) and europium oxide ($Eu_2O_3$).

A device shown in FIG. 1 is used to measure insulation resistance of counterpart test pieces and test pieces according to the invention under the temperature of 700° C. The device has brass-made electrodes 100, 200, a heater 300 and a 500-volt digital resistance meter 400. Regarding to measurement of thermal conductivity, laser flash method is used. An amount of magnesium (Mg) which is reduced to its oxide (MgO) is measured by means of I.C.P. (Isostatic Cold Press). Amount of the auxiliary agents and aluminum are each measured on the basis of fluorescent-sensitive X-ray detection.

The test pieces (Nos. 1~11) according to the invention are manufactured as follows:

(1) The mixture of the auxiliary agents (in case of Nos. 1~9), aluminum nitride (AlN) powder and ethanol, wax-related binder are kneaded overnight within a nylon pot by means of a ball. A quantity of the auxiliary agents added is determined by taking the fact into consideration that the auxiliary agents disappear during a sintering process described hereinafter.

(2) After spray drying from the mixture thus slurry, the mixture is pressed by a metallic die at 1 ton/cm² pressure, and is formed into a compact plate which measures 50 mm in diameter and 3 mm in thickness when the compact plate is employed to measurement of its electrical resistance.

(3) The compact plate is degreased by primarily heating it in an atmospheric environment at the temperature of 500° C. for two hours.

(4) Then the compact plate is sintered in accordance with the following magnesium diffusion process under the conditions indicated by Table 1. The magnesium diffusion processes and the conditions are such that the magnesium (Mg) is uniformly diffused into grains of the nitride-based sintered plate with an amount of the diffused magnesium (Mg) within a range from 20 ppm to 100 ppm (part per million) inclusive which is calculated by reducing the magnesium (Mg) to its oxidized component (MgO).

In this instance, the compact plate is milled to be 50 mm in diameter and 1.0 mm in thickness when it is employed to the measurement of its electrical resistance, while being milled to be 10 mm in diameter and 2.0 mm in thickness when it is employed to the measurement of its thermal conductivity.

The magnesium diffusion processes are as follows:

(a) After coating an admixture solution of 90 wt % BN, 10 wt % MgO and ethanol on the surface of the primarily sintered compact plate, and the plate is secondarily sintered in nitrogen atmosphere for the case of test piece Nos. 1, 2, 4, 6, 10 and 11.

(b) The primarily sintered compact plate is secondarily sintered within a magnesia shell (MgO shell) in nitrogen atmosphere for the case of test piece Nos. 3, 5, 7, 8 and 9. In this instances, the secondarily sintering temperature preferably ranges from 1600° C. to 1900° C.

According the test piece Nos. 1~11 of the invention, it is found that all of them have good insulation resistance and favorable thermal conductivity under the temperature of 700° C., thus making the sintered body well-suited for a spark plug insulator.

plug which is capable of preventing misignition at a wide range of operation temperature.

It is noted that the nitride-based ceramic categorically includes sialon (Trademark) and aluminum nitride oxide (AlON) as nitride oxide-based ceramic.

It is further noted that barium (Ba) is appropriate selection as alkali-based earth metal, while lanthanum (La), cerium (Ce) and dysprosium (Dy) are appropriate selection as rare-earth elements.

It is appreciated that the primarily sintered compact plate is secondarily sintered within a boron nitride shell (BN shell) whose inner wall is coated with magnesia (MgO) as indicated by BN+MgO shell. In this instance, the secondarily sintering temperature preferably ranges from 1600° C. to 1900° C.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

TABLE 1

| test piece No. | AlN containing rate (wt %) | containing rate of auxiliary agent | (wt %) | MgO containing rate (PPM) | MgO diffusion process | sintering condition (°C. × Hr) | thermal conductivity (W/m · k) | insulation resistance at 700° C. (MΩ) |
| --- | --- | --- | --- | --- | --- | --- | --- | --- |
| 1 | 90 | Y₂O₃ | 10 | 50 | BN + MgO coating | 1600 × 5 | 90 | 250 |
| 2 | 93 | Y₂O₃ | 7 | 90 | BN + MgO coating | 1850 × 5 | 98 | 600 |
| 3 | 93 | CaO | 7 | 80 | MgO shell | 1750 × 2 | 95 | 950 |
| 4 | 95 | SrO | 5 | 20 | BN + MgO coating | 1750 × 2 | 100 | 75 |
| 5 | 97 | SC₂O₃ | 3 | 30 | MgO shell | 1800 × 2 | 115 | 90 |
| 6 | 97 | Nd₂O₃ | 3 | 55 | BN + MgO coating | 1800 × 2 | 110 | 150 |
| 7 | 98 | Y₂O₃ | 2 | 85 | MgO shell | 1600 × 2 | 165 | 700 |
| 8 | 98 | EU₂O₃ | 2 | 95 | MgO shell | 1800 × 2 | 120 | 1050 |
| 9 | 98 | Y₂O₃ | 2 | 100 | MgO shell | 1750 × 2 | 160 | 1200 |
| 10 | 100 | | 0 | 50 | BN + MgO coating | 1850 × 5 | 150 | 160 |
| 11 | 100 | | 0 | 85 | BN + MgO coating | 1800 × 5 | 130 | 135 |
| 12 | 95 | Y₂O₃ | 5 | 10 | BN + MgO coating | 1800 × 2 | 115 | 35 |
| 13 | 98 | Y₂O₃ | 2 | 0 | BN shell | 1800 × 5 | 165 | 5 |
| 14 | 93 | CaO | 7 | 0 | BN shell | 1800 × 5 | 105 | 2 |
| 15 | 95 | Y₂O₃ | 5 | 150 | MgO shell | 1850 × 10 | 75 | 2000 |
| 16 | 98 | CaO | 2 | 200 | BN + MgO shell | 1900 × 2 | 80 | 1800 |
| 17 | 98 | Y₂O₃ | 2 | 350 | BN + MgO shell | 1900 × 5 | 68 | 3500 |
| 18 | 100 | | 0 | 10 | MgO shell | 1800 × 5 | 175 | 20 |

*Aluminum (Al) contained in sintered ceramic body 3 wt %, All sintered in nitrogen atmosphere.

Comparing the test piece Nos. 1~11 to the counterpart test piece Nos. 12~18 which are manufactured substantially in the same manner as the test piece Nos. 1~11, it is found that no diffusion rate of MgO (Nos. 13 and 14) and MgO of less than 20 ppm (Nos. 12 and 18) significantly decreases the insulation resistance, while MgO exceeding 100 ppm (Nos. 15, 16 and 17) greatly decreases the thermal conductivity.

It is noted that a spark plug insulator needs the thermal conductivity of more than 90 W/m and the insulation resistance of more than 50 MΩ at 700° C. from treeing-preventing viewpoint.

Aluminum of less than 3 wt % increases the thermal conductivity with the sintered ceramic body structurally fine-grained. Aluminum nitride (AlN) of less than 2.0 wt % oxygen-laden rate positively results in aluminum of less than 3 wt %.

A spark plug insulator is made in accordance with the test piece Nos. 1~11. After a center electrode, a resistor and a terminal electrode are placed within an axial bore of the insulator through a conductive glass sealant, the insulator is placed within a metallic shell to form a spark 1. A sintered ceramic body comprising magnesium (Mg) uniformly diffused into grains of a nitride-based ceramic body, the amount of the diffused magnesium (Mg) being within a range from 20 ppm to 100 ppm inclusive calculated by reducing the magnesium (Mg) to its oxidized component.

2. A sintered ceramic body as recited in claim 1 wherein, the nitride-based ceramic body includes auxiliary agents up to 10 weight percent selected from the group consisting of alkali-based earth metals, rare-earth elements and mixture of the alkali-based earth metals and the rare-earth elements, the weight percentage of the auxiliary agents being calculated by reducing the agents to their oxidized component.

3. A method of making a sintered ceramic body comprising steps of:

preparing a mixture of a nitride-based ceramic body including auxiliary agents selected from the group consisting of alkali-based earth metals, rare-earth elements and mixture of the alkali-based earth metals and the rare-earth elements;

the resulting mixture pressed to form a compact body; and the compact body being placed within a magnesia shell, and sintered under the temperature ranging from 1600° C. to 1900° C. in order to uniformly diffuse magnesium (Mg) into grains of the nitride-based ceramic body, the amount of the diffused magnesium (Mg) being within a range from 20 ppm to 100 ppm inclusive calculated by reducing the magnesium (Mg) to its oxidized component.

4. A method of making a sintered ceramic body comprising steps of:

preparing a mixture of a nitride-based ceramic body including auxiliary agents selected from the group consisting of alkali-based earth metals, rare-earth elements and mixture of the alkali-based earth metals and the rare-earth elements;

the resulting mixture pressed to form a compact body; and the compact body being placed within a boron nitride (BN) shell, inner surface of which is coated with magnesia (MgO), and sintered at a temperature ranging from 1600° C. to 1900° C. in order to uniformly diffuse magnesium (Mg) into grains of the nitride-based ceramic body, an amount of the diffused magnesium (Mg) being within a range from 20 ppm to 100 ppm inclusive calculated by reducing the magnesium (Mg) to its oxidized component.

5. A method of making a sintered ceramic body comprising steps of:

preparing a mixture of a nitride-based ceramic body including auxiliary agents selected from the group consisting of alkali-based earth metals, rare-earth elements and mixture of the alkali-based earth metals and the rare-earth elements;

the resulting mixture pressed to form a compact body;

applying magnesia (MgO)-laden solution onto the surface of the compact body; and the compact body sintered at a temperature range from 1600° C. to 1900° C. in order to uniformly diffuse magnesium (Mg) into the grains of the nitride-based ceramic body, an amount of the diffused magnesium (Mg) being within the range from 20 ppm to 100 ppm inclusive calculated by reducing the magnesium (Mg) to its oxidized component.

6. A sintered ceramic spark plug insulator having the composition in accordance with claim 1.

7. A sintered ceramic spark plug insulator having the composition in accordance with claim 2.

* * * * *